Sept. 3, 1968     A. MARTIN     3,399,561
PORTABLE RIVET SETTING TOOL
Filed Jan. 27, 1966
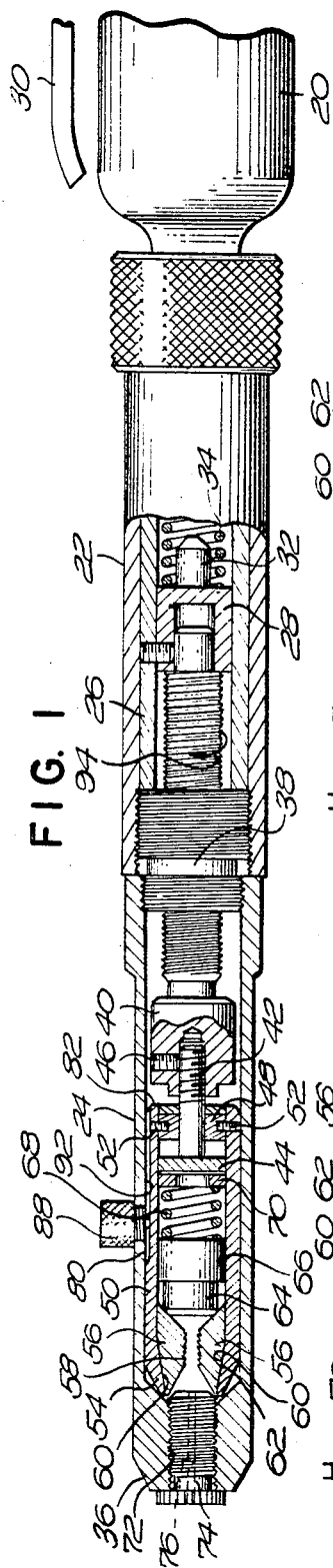
INVENTOR.
ALAN MARTIN
BY Wolf, Greenfield & Hacken
ATTORNEYS

United States Patent Office 3,399,561
Patented Sept. 3, 1968

3,399,561
PORTABLE RIVET SETTING TOOL
Alan Martin, Lantern Lane, Sharon, Mass. 02067
Filed Jan. 27, 1966, Ser. No. 523,325
8 Claims. (Cl. 72—391)

ABSTRACT OF THE DISCLOSURE

A mandrel rivet setting tool having an axially movable and rotatable shaft connected to a sleeve which carries jaws that open and close to grab the mandrel. The sleeve moves axially or axially and rotatably and moves the jaws with it to break the mandrel.

---

This invention relates to portable rivet setting tools and more particularly comprises a tool for setting mandrel-type rivets.

Mandrel-type rivets, regularly called pop rivets, are a widely used type of fastener.

One important object of this invention is to provide a very light-weight portable power tool for setting pop rivets.

Another important object of this invention is to provide a pop rivet setting tool which engages, sets and subsequently releases the pop rivet without any significant work on the part of the operator other than that of actuating the control switch.

Yet another important object of this invention is to provide a pop rivet setting tool which may combine the application of shear and tension forces for breaking the mandrel of the rivet.

Yet another important object of this invention is to provide a device for setting pop rivets, which initially applies tension forces on the mandrel to properly set the pop rivet and which thereafter may apply either tension or tension and shear forces in combination to actually break the mandrel.

Still another important object of this invention is to provide a rivet tool having a removable anvil so that different anvils may be used to handle rivets of different sizes.

To accomplish these and other objects the rivet setting tool of this invention includes among its features a housing and a shaft rotatably mounted in and relative to the housing. When the shaft is rotated in one direction it moves axially forward in the housing, and when it is rotated in the opposite direction it moves axially rearward in the housing. Means are connected to the rear end of the shaft which typically may be an electric or air motor for introducing the rotation. A sleeve is secured to the shaft by a rotary clutch which in one embodiment of this invention causes the sleeve to rotate with the shaft when the clutch is engaged. Gripping means are disposed in and rotate with the sleeve for receiving and gripping the mandrel of the rivet, and means are disposed within the housing and operatively connected to the shaft for opening the jaws to receive the mandrel when the shaft moves forwardly in the housing. Means are provided in the sleeve for causing the jaws to move rearwardly and grip the mandrel when the shaft itself moves rearwardly. In one embodiment removable means are mounted on the housing, capable of engaging the sleeve, for preventing or allowing sleeve rotation as the shaft rotates.

In accordance with another embodiment of this invention, a bearing is introduced into the rotary clutch to reduce or eliminate the sleeve rotation. The effective pull of the drive motor is substantially increased by reducing the load imposed on it by the clutch, and the resultant available power enables the mechanism with the application of tension forces alone to break the mandrel.

These and other objects and features of this invention along with its incident advantages will be better understood and appreciated from the following detailed description of two embodiments thereof, selected for purposes of illustration and shown in the accompanying drawing, in which:

FIG. 1 is a side view, partly in section, of one embodiment of a rivet tool constructed in accordance with this invention;

FIG. 2 is an enlarged fragmentary view of the tool of FIG. 1 in a position to accept the mandrel of a pop rivet;

FIG. 3 is a view similar to FIG. 2 but showing the tool gripping the mandrel;

FIG. 4 is a view similar to that of FIGS. 2 and 3, but showing the jaws of the tool in the rearward position with the rivet set and the mandrel broken;

FIG. 5 is a detail view of a portion of the tool; and

FIG. 6 is a fragmentary cross-sectional view of another embodiment of this invention.

In the embodiment of this invention shown in FIGS. 1–5, a motor 20 is shown mounted on the end of two coaxial housing sections 22 and 24. The motor shown is electrically operated and has a grip-type switch actuator 30. The motor may be any one of many different varieties but preferably is relatively small and light-weight so that it may be handled easily by the operator. The switch 30 is of the type which when initially actuated causes the motor to turn on and rotate its shaft in one direction. When released, the motor stops. The next actuation of the switch causes the motor shaft to rotate in the opposite direction.

The motor shaft (not shown) of motor 20 may be connected through a clutch (not shown) disposed in the housing 22 to main shaft 26 by a collar 28 also disposed in the housing 22 as shown in my earlier Patent No. 3,197,987. The collar 28 has a rearwardly extending boss 32 which is engaged by a coil spring 34 that urges the boss forwardly in the direction of the front end 36 of the housing section 24. Because shaft 26 is rigidly connected to the collar, and because the collar 28 is connected through the clutch (not shown) to the motor shaft, when the clutch is engaged, rotation of the motor causes the shaft 26 to rotate.

The shaft 26 extends through internally threaded fitting 38 which joins the housing sections 22 and 24 together. As the shaft 26 is threaded its rotation through the internally threaded fitting 38 causes the shaft to move axially either toward or away from the front end 36 of the housing section 24 when the motor is energized.

A collar 40 is secured to the outer end of the shaft 26 and rotates directly with it. The collar 40 is in turn directly connected to the stem 42 of the front clutch plate 44 by the set screw 46. It will be noted that the stem 42 is itself threaded into the collar 40, and the set screw 46 prevents relative rotation between the two parts.

The clutch plate 44 cooperates with driven clutch plate 48 behind it, which in turn is directly keyed to sleeve 50 by means of the slotted pins 52. Thus, when the clutch plates 44 and 48 are engaged (they are not engaged in FIG. 1), rotation of the shaft 26 may cause the sleeve 50 to rotate. However, when the clutch plates are disengaged, the sleeve 50 will not rotate in response to the rotation of the shaft.

The sleeve 50 is generally cylindrical in shape, but the front end 54 is somewhat tapered both inside and out. The front end of the sleeve houses the two jaws 56, each being provided with a semi-cylindrical gripping channel 58 that together cooperate to define a jaw opening which receives the mandrel of the pop rivet. It is evident from an inspection of the drawing that when the tapered inner surface of the sleeve presses against and pushes rearwardly on the tapered outer surface of the jaws 56, the jaws 56 move rearwardly away from the front end and are pressed together so as to make the opening for the mandrel smaller.

The rear ends of the jaws 56 are somewhat flared to receive the leading end 64 of the jaw actuator 66. The jaw actuator 66 when moved forwardly against the rear of the jaws 56 tends to spread the jaws apart so as to enlarge the gripping opening 58 that receives the mandrel. A spring 68 bears against the rear side of the jaw actuator 66 and a washer 70 in turn disposed adjacent the front clutch plate 44, and the spring 68 yieldably urges the jaw actuator in a forwardly direction against the jaws 56.

The sleeve 50 is disposed inside the cylindrical bore within the housing section 24 and it may move axially in that housing section. The forward end of the housing 24 is closed except that it is provided with a threaded opening 72 that receives the anvil 74 which in turn serves as a support for the head end of the pop rivet when it is being set by the device. It will be noted that the anvil is provided with an axial bore 76 through its center, and the rear end 78 of the anvil is somewhat tapered to cooperate with the rearward taper provided on the inner surface of the front end of the jaws 56 leading to the gripping openings 58 in the jaws. It will be apparent that when the forward ends of the jaws 56 are engaged by the rear end 78 of the anvil adaptor, the front ends of the jaws are urged to open so as to admit the mandrel of the pop rivet (see FIG. 2).

In the embodiment of FIGS. 1–5, a keyway 80 is provided in the cylindrical outer surface of the sleeve 50, which keyway extends from the rear end 82 of the sleeve, approximately to its center. The keyway 80 cooperates with a key or pin 84 (see FIG. 5) mounted on the housing section 24 to control the rotation of the sleeve. The key 84 is movable in and out of the keyway 80 in bushing 86 that is threaded into the housing section 24. The bushing is covered by a cap 88 also threaded on the bushing. A light spring 90 within the bushing 86 bears against the head of the pin 84 to urge it to extend inwardly below the surface 92 of the housing section 24 and into the keyway 80. It is evident that the spring 90 allows the pin to move upwardly into the bushing so that it will not interfere with the rotation of the sleeve 50 when the forward portion of the sleeve, which does not include the keyway, is aligned radially with it.

In operation the tool shown in the drawing performs as follows: the operator actuates the switch 30 of the motor which causes the shaft 26 to turn in the direction of arrow 94. As the shaft 26 rotates in that direction, it moves forwardly with respect to the housing sections 22 and 24, and the sleeve 50 comes in contact with the closed end 36 of the section 24. With continued rotation of the shaft 26, the clutch plates 44 and 48 disengage (as in FIG. 1) and the sleeve 50 remains fixed. The jaws 56 are pressed against the rear end 78 of the anvil 74 and are in turn engaged at their back end by the leading portion 64 of the jaw actuator 66. This action causes the jaws 56 to spread and enlarge the gripper opening 58. The parts are shown in this position in FIG. 2. It will be noted that when the sleeve 50 is in its forwardmost position, the pin or key 84 lies within the keyway 80, and the key is disposed rearwardly of the front of the keyway. When the parts are in the position described, the mandrel M of the pop rivet R may be inserted through the anvil 74 so that the rearward end of the mandrel lies within the jaw opening 58. The head H of the pop rivet is held against the work W by the general orientation of the tool (see FIG. 2).

With the mandrel of the rivet in place, the operator actuates the motor switch once again, which causes the motor to rotate in the opposite direction, and the shaft 26 rotates in the direction opposite to arrow 94 so that it moves rearwardly (to the right in FIG. 1) in the housing sections. As this occurs, the clutch plate 44 and 48 slip with respect to one another because the sleeve 50 is prevented from rotating by the keyway 80 and pin 84 engagement. However, the shaft 26 does move the sleeve 50 rearwardly in the housing section 24 when the plate 44 does engage the clutch plate 48. As the sleeve moves rearwardly along its axis, the rear end 78 of the anvil disengages the front end of the jaws 66, and the forward end 64 of the jaw actuator releases the rear end of the jaws. The cone-shaped surface 60 of the forward end 54 of the sleeve bears against the inclined surfaces 62 of the jaws and pushes them rearwardly in the housing. The pressure applied through the surfaces 62 presses the jaws together and causes the gripper opening 58 to engage firmly the mandrel M of the pop rivet R.

As the sleeve continues to move rearwardly, the grip on the mandrel finally squeezes tight enough to cause the mandrel M to move rearwardly with the jaws, and the mandrel head H flares the forward end of the body B of the pop rivet R (see FIG. 3). As the rivet body flares the pin 84 rides out of the keyway 80 and allows the sleeve to rotate. The continued pull of the jaws on the mandrel as the jaws with the sleeve move rearwardly in the housing sections, and the additional twisting force applied to the mandrel by the turning of the sleeves 50 cooperate to break the mandrel. The head H of the mandrel is left within the body B of the rivet. To remove the portion of the mandrel broken off in the jaws (see FIG. 4), the operator need only reverse rotation of the shaft 26 once again, which will move the sleeve and the jaws to the forward position, which ultimately causes the jaws to open and in turn releases the mandrel end.

From the foregoing description it will be appreciated that the initial action of the tool on the mandrel is a pull which causes the mandrel to properly set the rivet by spreading its end over the work being fastened as shown in FIG. 3. The additional force required to break the mandrel is supplied both by pulling and twisting in the embodiment of FIGS. 1–5, and this action allows the machine to set a heavier rivet than would otherwise be possible. In actual practice, a two pound motor having a rating of 750 r.p.m.-1.5 amp. on a tool having a total weight of approximately three pounds including the motor, is able to set a steel pop rivet of $3/16''$ steel rivet and steel mandrel size.

It should be borne in mind that the machine need not be used with the key 84; that is, the key may be removed so as to allow the sleeve to twist freely in the housing section 24. Because the cap 88, bushing 86, spring 90 and key 84 may be removed, the operator is free to use or not use the attachment as he sees fit.

It is evident in the drawing that the anvil 74 may be removed by merely unscrewing it from the seat provided in the closed end 36 of the housing section 24. Smaller pop rivets having smaller diameter mandrels will be better set if the anvil has a hole through its center which is relatively small so as to firmly position the pop rivet with respect to the anvil. On the other hand, a larger pop rivet having a heavier mandrel will require an anvil having a correspondingly larger opening.

The embodiment of FIG. 6 differs from that of FIGS. 1–5 in the operation of the sleeve 50. While in the first embodiment the sleeve moves both axially and rotationally in the housing section 24 in breaking the mandrel of the rivet, in this embodiment the sleeve motion is generally confined to an axial direction and the mandrel is broken by a pull upon it. In FIG. 6, a bearing 100 is shown interposed between the drive and driving clutch plates 44 and 48, respectively. The bearing 100 greatly reduces the load upon the motor by allowing the plate 44 to slip freely with respect to the other plate. It also effectively eliminates the turning of the sleeve 50 with rotation of shaft 26. As the shaft rotates and moves rearwardly in the housing and draws the sleeve 50 rearwardly with it, the jaws within the sleeve grip the mandrel of the rivet but the bearing 100 does not transfer the shaft rotation to the sleeve and jaws. Therefore, the force on the mandrel is a tension force which alone breaks the mandrel. The elimination of the twisting action ensures that the mandrel sets the rivet straight without any tipping of the mandrel head H in the rivet body. The elimination of the friction load increases the effective power of the motor for pulling action on the mandrel so that it may set the rivet and break the mandrel without the twist. The bearing 100 does away with the need for the pin 84 and keyway 80, but alternatively a keyway may be provided on the sleeve and extend its full length and receive a pin. The inclusion of such parts will, of course, completely eliminate the sleeve rotation.

From the foregoing description those skilled in the art will appreciate that numerous modifications may be made of this invention without departing from its spirit. For example, the motor 20 shown, may be replaced by an air motor to rotate the shaft 26. Further, while the specification refers to shaft rotation, it is possible to rotate the fitting 38 rather than the shaft to cause the shaft to move axially within the housing. Therefore, it is not intended to limit the scope of this invention to the specific embodiment illustrated and described. Rather, it is intended that the scope of this invention be determined by the appended claims and their equivalents.

What is claimed is:
1. A mandrel rivet setting tool comprising
   a housing,
   an internally threaded fitting secured in the housing,
   an externally threaded shaft rotatably and axially movable in the housing and screwed into the fitting and when rotated in one direction causing the shaft to move axially forward in the housing and when rotated in the other direction causing it to move axially rearward in the housing,
   a motor connected to the rear end of the shaft for rotating it in either direction,
   a sleeve connected to the front end of the shaft and movable axially and rotatably with the shaft in the housing,
   a rotary clutch connecting the shaft to the sleeve enabling the sleeve to slip rotatably with respect to the shaft,
   a pair of jaws disposed in the sleeve for gripping the mandrel of a rivet,
   a jaw actuator disposed in the sleeve behind the jaws and biased against the rear of the jaws for opening the jaws so that they can accept the mandrel when the shaft moves forwardly in the housing,
   an anvil secured to the front end of the housing in front of the sleeve for opening the front of the jaws when they engage the anvil,
   and a pair of inclined planes engaging the jaws, for clamping the jaws on the mandrel when the sleeve is moved rearwardly in the housing.
2. A mandrel rivet setting tool comprising
   a housing,
   a shaft rotatably mounted in the housing and when rotated in one direction with respect to the housing moving axially forward in the housing and when rotated in the opposite direction with respect to the housing moving axially rearward in the housing,
   means operatively connected to the shaft for rotating it with respect to the housing,
   a sleeve secured to and movable back and forth in the housing with the shaft,
   a gripping means disposed in the sleeve for gripping the mandrel of a rivet,
   means disposed within the housing and operatively connected to the shaft for opening the jaws to receive the mandrel when the shaft moves forwardly in the housing,
   means formed in the sleeve for causing the jaws to move rearwardly and grip the mandrel when the shaft moves rearwardly,
   a rotary clutch interconnecting the sleeve and shaft, said clutch including drive and driven plates separated by bearings preventing rotation of the drive plate from rotating the driven plate,
   the drive plate being connected to the shaft and the driven plate to the sleeve,
   and means including the clutch enabling the shaft to move axially with respect to the sleeve.
3. A mandrel rivet setting tool as defined in claim 1, further characterized by
   means operatively associated with the sleeve for preventing the sleeve from rotating over a selected portion of its axial motion.
4. A mandrel rivet setting tool as defined in claim 1, further characterized by
   means secured between the sleeve and housing confining the motion of the sleeve to an axial direction as the sleeve travels rearwardly from its forwardmost position for a predetermined distance.
5. A mandrel rivet setting tool as defined in claim 2 further characterized by
   an anvil secured to the front of the housing and cooperating with the means disposed in the housing for opening the gripping means.
6. A mandrel rivet setting tool as defined in claim 5 further characterized by
   said means disposed within the housing lying within the sleeve.
7. A mandrel rivet setting tool as defined in claim 2 further characterized by
   a key and keyway interconnecting the sleeve and housing for guiding the sleeve axially within the housing.
8. A mandrel rivet setting machine,
   a housing,
   gripping means mounted in the housing for engaging the mandrel of the rivet,
   and actuating means secured to the gripping means for first pulling the gripping means within the housing without twisting the mandrel and subsequently for simultaneously twisting and pulling the mandrel.

References Cited
UNITED STATES PATENTS

| | | | |
|---|---|---|---|
| 2,428,165 | 9/1947 | Ketchum | 72—114 |
| 3,002,644 | 10/1961 | Merer | 72—391 |
| 3,028,987 | 4/1962 | Van Hecke | 72—391 |
| 3,095,106 | 6/1963 | Morrison | 72—391 |
| 3,144,158 | 8/1964 | Nouvelet | 72—391 |
| 3,197,987 | 8/1965 | Martin | 72—114 |

CHARLES W. LANHAM, *Primary Examiner.*

G. P. CROSBY, *Assistant Examiner.*

UNITED STATES PATENT OFFICE
CERTIFICATE OF CORRECTION

Patent No. 3,399,561 September 3, 1968

Alan Martin

It is certified that error appears in the above identified patent and that said Letters Patent are hereby corrected as shown below:

Column 1, line 20, cancel "regularly called pop rivets". Column 1, lines 26, 31 and 35, column 2, lines 13 and 72, column 3, lines 21, 31, 67 and 69, and column 4, lines 16, 21, 45 and 60, cancel "pop", each occurrence.

Signed and sealed this 21st day of April 1970.

(SEAL)
Attest:

Edward M. Fletcher, Jr.           WILLIAM E. SCHUYLER, JR.
Attesting Officer                  Commissioner of Patents